June 4, 1929.  H. L. WOODWARD  1,715,402
VEHICLE BODY AND WINDSHIELD CONSTRUCTION
Filed Feb. 11, 1926    5 Sheets-Sheet 1

Inventor
H. L. Woodward

June 4, 1929. H. L. WOODWARD 1,715,402
VEHICLE BODY AND WINDSHIELD CONSTRUCTION
Filed Feb. 11, 1926   5 Sheets-Sheet 2

Inventor
H. L. Woodward

Inventor:
H. L. Woodward

Patented June 4, 1929.

1,715,402

UNITED STATES PATENT OFFICE.

HORACE L. WOODWARD, OF ARLINGTON RIDGE, VIRGINIA.

VEHICLE BODY AND WINDSHIELD CONSTRUCTION.

Application filed February 11, 1926. Serial No. 87,636.

The invention has for an object to effect an improvement in body construction for motor vehicles, and especially such as are known as the "closed type", under which head there are several styles named variously, including the "coach", the "sedan" the "coupé", the "limousine", etc. It is an especial aim to provide for the elimination of pillars or other opaque supports extending between the top and the body at the extreme forward part, which is now an essential feature of all constructions in closed car types. It has long been sought to reduce the cross sectional dimensions of these elements, which is the present tendency in the art, but it is the purpose of my invention to eliminate entirely any such connections or supports. It is a further specific aim of the invention to present improvements contributing to the broader aim above mentioned, as may be more readily understood hereinafter, the invention including additional objects, advantages and features of invention, as will be more readily understood from the description and the accompanying drawings, wherein.

Figures 1, 2:
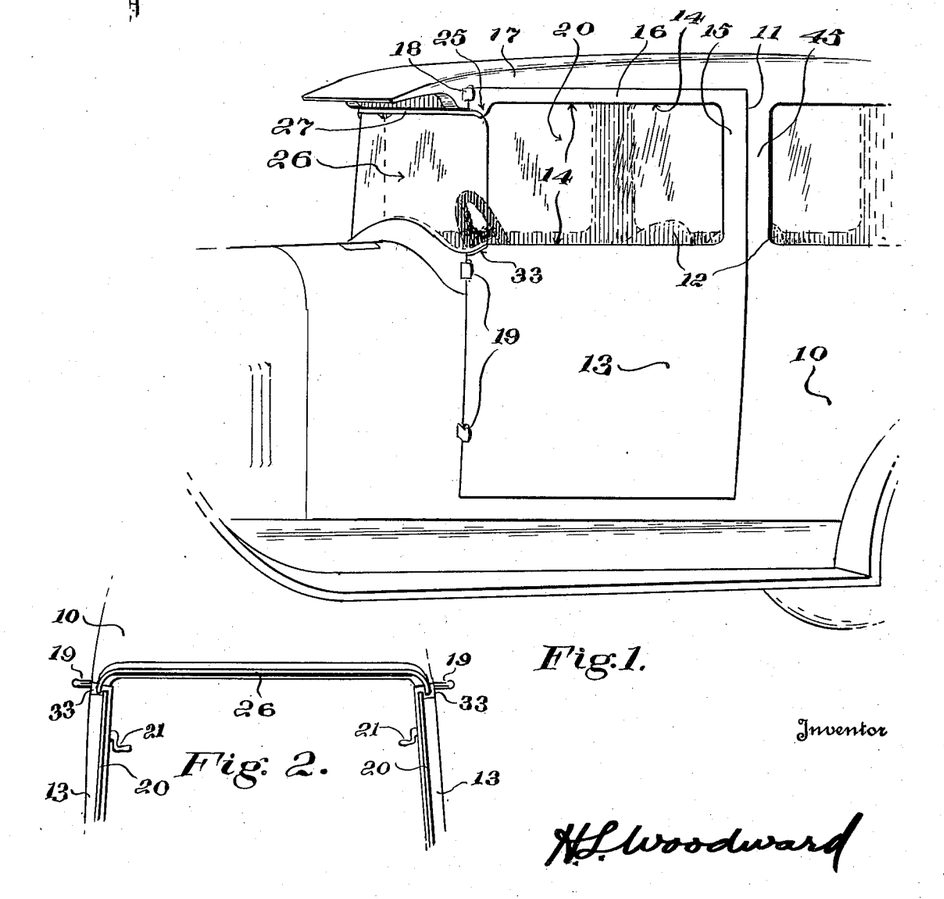
Figure 1 is a fragmentary perspective view of a type of enclosed car embodying my invention.
Figure 2 is a fragmentary horizontal sectional view of the extreme forward part of the vehicle body looking downwardly.
Figures 5, 6, 7, 8, 9, 10, 11, 12, 13:
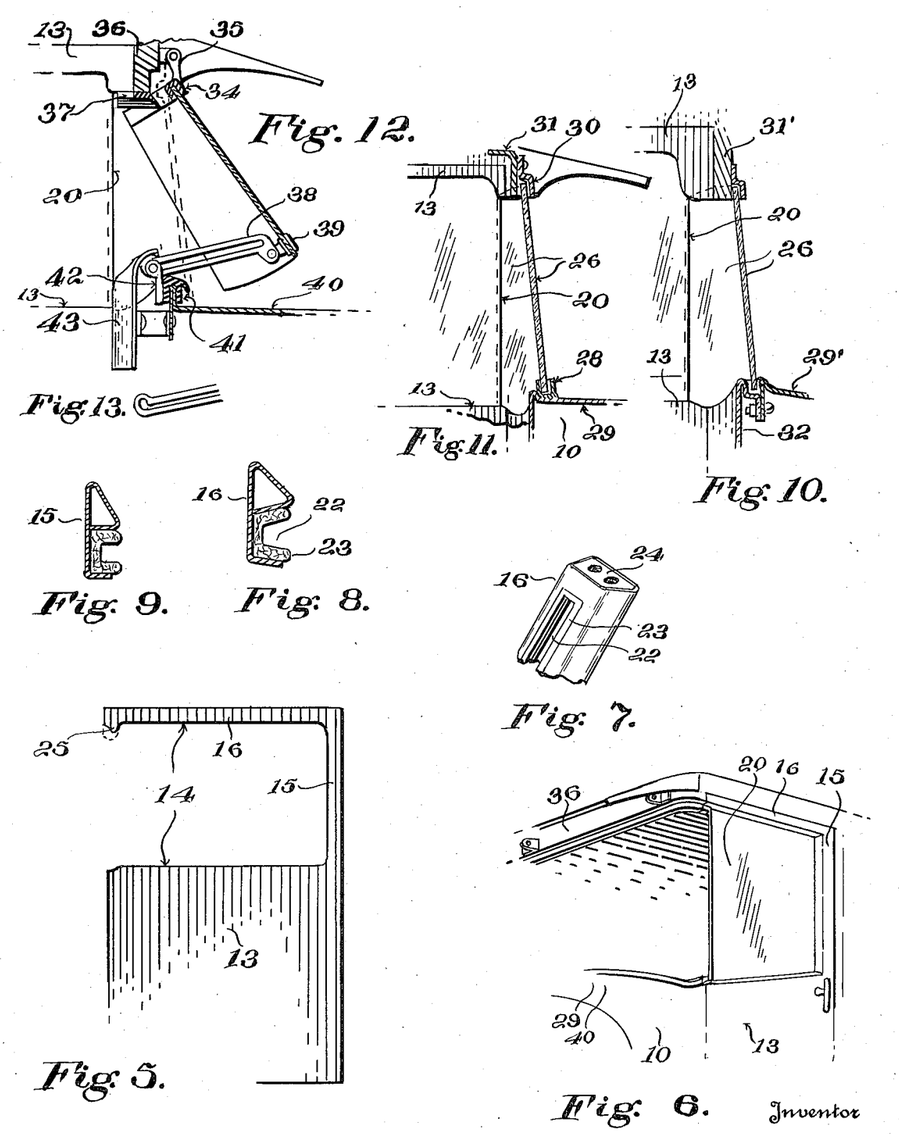
Figure 5 is an elevational view of the door, detached.
Figure 6 is a fragmentary perspective view of one forward corner of the vehicle with the windshield element removed.
Figure 7 is a view of the forward end of the top member of the door in one embodiment.
Figures 8 and 9 show cross sections of the top members and rear stile member of the door.
Figure 10 is a fragmentary vertical longitudinal section of a vehicle, intermediately of the windshield.
Figure 11 is a similiar view showing an all-metal body construction.
Figure 12 is a similar view showing the windshield shiftable, with means for supporting it in open and closed positions.
Figure 13 is a fragmentary detail of the supporting link for the shiftable windshield.
Figure 14:
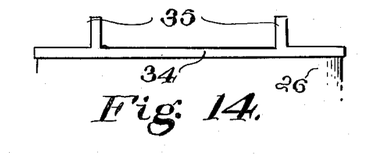
Figure 14 is a detail front view of the top supporting member for the shiftable windshield, last named.
Figure 15:
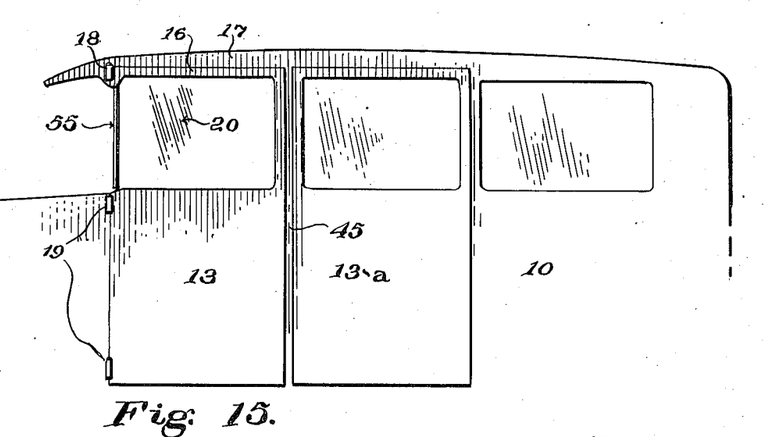
Figure 15 is a side elevation of a sedan type of body in all-metal construction, with non-essential parts omitted, showing also a modification in the form of the windshield and its relation to the lights in the doors.

There is illustrated in Figure 1 what is generally designated in the automotive trade as a "coach", the general contours of which may conform to standard practice, and in Figure 15 a "sedan" is shown. The structure differs from the prior practice, however, in the omission of any pillars or other frame connections between the body and the roof adjacent the front edge of the door 13. The body 10 incorporating my invention is adapted to be embodied in either wood or metal, a doorway 11 being provided at the forward part immediately adjacent the forward seat 12, in which doorway there is provided a door 13, having a window opening 14 therein formed by a rear stile 15 and a top member or bar 16, there being no connection between the lower body portion of the door and the top bar at the forward side of the door, contrary to present practice. Preferably, the top bar 16 at its extremity is alined with the forward edge of the lower portion of the door, and connected to the roof 17 of the car by means of a hinge 18, hinges 19 being used to connect the lower part of the door to the body of the car in accordance with usual practice. The door 13 has mounted therein for vertical movement a light 20 of glass, adapted to be raised and lowered by any usual mechanism adapted to be mounted in the lower part of the door, one form being in general use at present including a crank 21 at the inner side of the door, as shown in Figure 2. The lower body portion of the door is formed with the usual slot therein to permit the light 20 to be moved downwardly within the door and upwardly therefrom to close the opening 14, as required, and in order to properly guide the light 20, a felt 20′ may be provided at the forward end of this slot to guide the forward edge of the glass as it rises, the rear stile 15 of the door being constructed in accordance with standard practice as well as the top bar 16, with the possible exception that it may be found desirable to form the groove 22 therein slightly wider than standard, with divergent sides, the felt 23 therein being similarly formed, to receive the upper edge portion of the light 20. In this way, the glass will be supported in the groove of the rear stile of the door and will not require support at the forward edge of the door. Also, when the glass is fully raised, it will be firmly supported by retention in the groove 22 of the top member 16. Possible forms for the top member 16 and stiles 15 are shown in Figures 8 and 9, adapted to be constructed in metal. The forward end of the top bar 16 may extend flush to the end, as shown in Figure 7, or in those cases where the mounting for the windshield is at a lower level than the top of the window opening, a knob or other suitable downward extension 25 of corresponding extend may be formed on the top bar 16 of the door. A block 24 is shown brazed or welded in the forward end of the top bar 16, which may be suitably apertured to receive screws or bolts by which one member of the hinge 18 is secured thereto. Any other approved practice for such construction may be followed.

A windshield or front closure 26 is shown (Figures 1, 2, 10 to 12, and 22) for closing the space between the body and roof across the front, and this is preferably made of glass. The shield 26 may be permanently fixed at its upper and lower edges to the roof portion and the body, or may be made movable or removable, if desired. As shown in Figure 1, a metal frame piece 27 is indicated as secured to the upper edge of the glass, and the lower edge may be similarly reinforced and secured, or otherwise as desired. In case the glass is permanently secured in place, this may be accomplished by providing on the lower edge of the glass a channelled piece 28 which may be welded or otherwise secured to the rear portion of the cowl 29 as shown in Figure 11, while the upper edge may be secured by an angular plate 30 secured to a cross member 31 forming a part of the framing of the car roof. In Figure 10 a mounting is shown which is similar in the upper part, except that the parts are in a size corresponding to that in wooden body constructions, while at the lower part, the cowl 29′ is formed with a downwardly extended flange to which there is secured a dash element 32 so as to provide a groove next to the cowl in which the lower edge of the glass may be set. It is understood that in all metal edging of windshield elements referred to, or other permanent attachments to the glass, suitable cement may be interposed between the glass and the mounting or any approved method employed for securing the parts firmly together and guarding the glass against fracture at the edge.

Figures 22, 23:
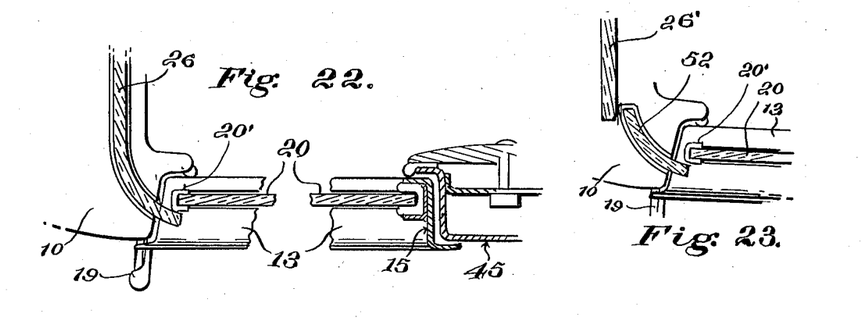
Figure 22 is an enlarged horizontal sectional view of the door and immediately abutting portion of the windshield, as adapted to metal body constructions.
Figure 23 is a similar view showing the utilization of the structure of Figure 21 in the same body as shown in Figure 22.

After one method of construction, whether the windshield is permanently secured in place or pivoted, the central or body portion of the windshield is planiform and located in a plane slightly forward of the door, or having its lower edge forwardly of the door, while the lateral end portions of the shield 26 are curved rearwardly, so that the vertical edges thereof as shown in Figures 1 and 2 project into the opening 14 of the door when the door is closed, and lie spaced slightly outward of the planes of the lights 20 and in overlapped relation with the lights when raised, as shown in Figure 2 and after the manner shown in Figure 22 also. The bottom edge of the shield 26 is inclined slightly upward at the lateral extremity, while the top edge thereof is inclined downwardly at the extremity, and the forward part of the opening 14 is shaped to move into snug relation to these edges, as indicated in Figure 1, but preferably not in direct contact therewith, and if desired, cushion elements may be interposed between the door body and shield 26 at these parts, as indicated at 33. In case it is desired to pivot the shield 26, this may be accomplished by adaptation of hinged supports thereto, one instance thereof being shown in Figure 12, where a channel piece 34 is shown secured to the upper edge of the shield, from which pivot lugs 35 extend upwardly and are pivoted upon the cross member 36 of the roof, which is rabbeted to receive the edge of the shield snugly, and a weather stripping 37 may be incorporated, if desired. The shield is pivoted in this instance so as to swing away from the cross member 36 when it is open, admitting air over the top of the windshield as well as at the lower part, and extensible means are provided for securing the lower edge of the shield in adjusted positions, consisting of a longitudinally slotted link 38, having one end pivoted upon a bolt 39 fixed in the lower part of the glass, the cowl 40 having an upwardly extending lip at the rear edge upon which a weatherstripping 41 of suitable character is provided to form a snug joint with the lower edge of the windshield when the latter is moved to closed position. A clamping device 42 is mounted upon the rear part of the cowl, including an element slidable in the slot of the link, and the link is so formed that when the shield 26 is in closed position, the link may drop into vertical pendant positions, so that it will not project objectionably into the body of the vehicle. In the present instance, a familiar form of wind-deflector 43 is shown mounted in spaced relation to the rear edge of the cowl, and projecting above the weather stripping device 41, this deflector being slotted in line with the link 38 so that the latter may swing in the slot properly for opening and closing, as indicated.

Figure 3:
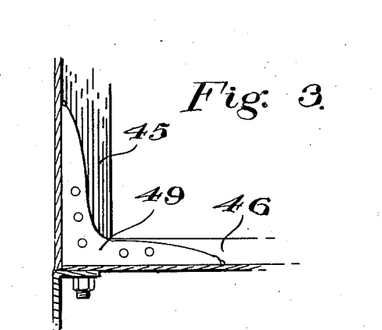
Figures 3 and 4 illustrate the use of knee braces at the bottom and top of the body for transverse bracing of the pillar element at the rear of the front door, in case this is found desirable.
Figure 4:
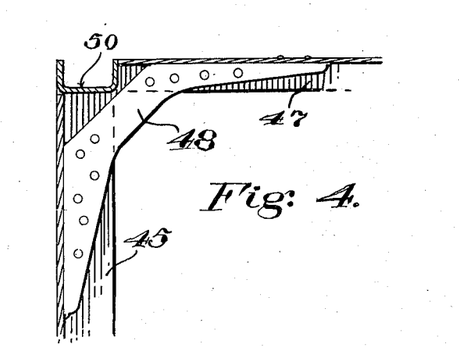

To the rear of the doorway in the body 10 a pillar 45 is incorporated at each side, and in order to overcome the liability of side sway at the forward part of the roof, especially where the windshield is adapted to be opened, the body may be reinforced to prevent such sway by incorporating cross members at the bottom and top of the framing, the latter being within the roof of the car, as will be understood, these cross members being indicated at 46 and 47 respectively, in Figures 3 and 4. They may be utilized in conjunction with knee-elements 48 and 49, the form shown at 48 being adapted to use at the lower part of the floor, especially in case a permanent seat is located between the pillars. Reinforcement will not be required ordinarily at other parts of the car, owing to the transverse rigidity imparted to the frame-work by the body structure at the rear end, and especially where pressed metal forms are used on the rear quarters of the car reinforcements at the pillars may not be found necessary. Other methods of reinforcement may be employed, as well. The chassis frame of a vehicle may be connected to the body if desired, so as to avail of the rigidity of the chassis frame, in which event special cross members may not be required. If the windshield glass is permanently fixed between the roof and cowl, it may be utilized to impart rigidity to the relation between the roof and cowl, as indicated.

Figures 24, 25, 26, 27, 28:
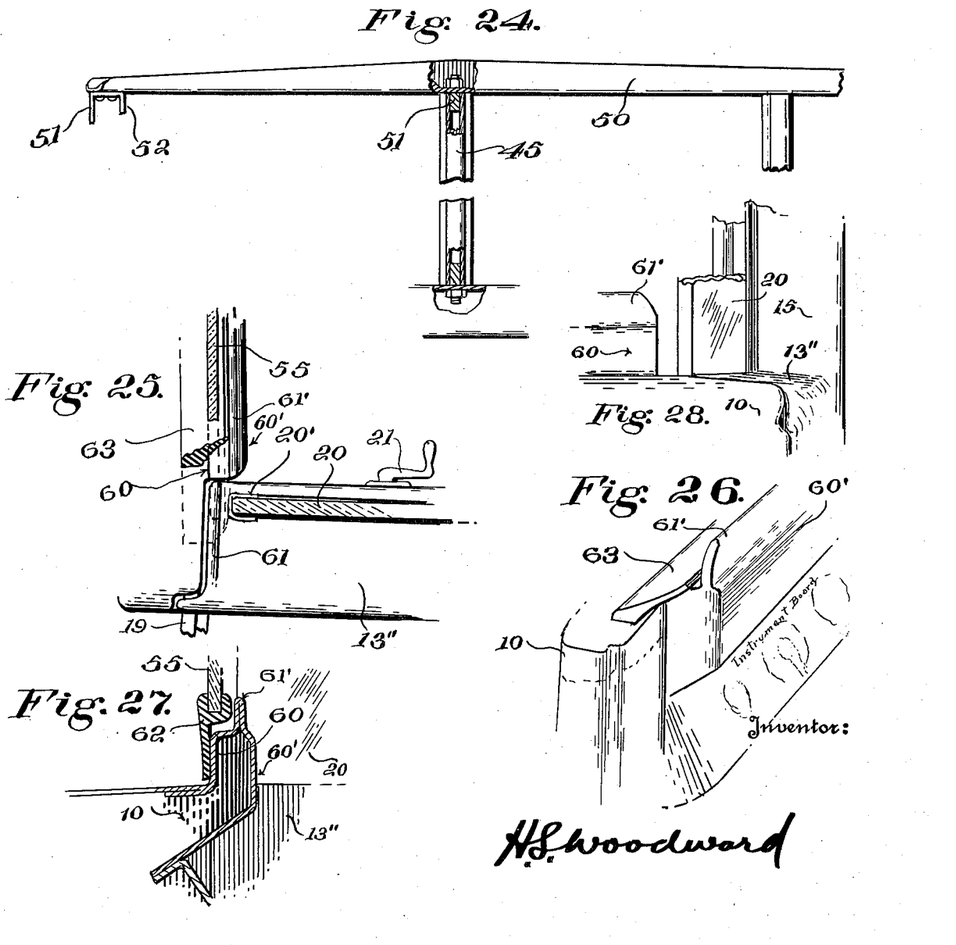
Figure 24 is a fragmentary side view of a metal frame construction for a vehicle body in which my invention is embodied.
Figure 25 is a fragmentary horizontal section through the windshield and door light at one corner looking downward.
Figure 26 is a fragmentary perspective view of the body portion in the last named figure, with the door removed and element 51 omitted.
Figure 27 is a fragmentary vertical, longitudinal sectional view at the forward part of the body adjacent the lower side of the windshield, showing a customary construction in metal body construction adapted to the arrangement shown in Figure 15 and Figure 25.
Figure 28 is a fragmentary front elevation of the body parts involved in Figures 26 and 27.

In Figure 24 there is shown an example of roof framing construction which may be followed, if desired, the construction preferably being such that the roof will have proper rigidity to prevent the forward projecting part from oscillating vertically unduly when a vehicle moves rapidly over inequalities of road surface. The construction indicated is adapted to use in metal bodies, and adaptation of the construction to wooden framing will be readily understood. The present body constructions in metal include side channels 50, and it may be found desirable to utilize a slightly deeper or stronger channel piece extending from a distance rearwardly of the post 45. The channel member 50 may be tapered toward the forward end, and there may be connected to a cross member 51, which may correspond to the member 31 shown in Figure 11. Immediately under the channel 50 the member 51 is provided with a downturned ear 52 to which the hinge 18 may be connected in any approved manner. The post 45 may be constructed to permit second door 13ᵃ to be mounted rearwardly thereof, of standard construction. In the event that the knee element previously referred to is not employed at the roof, it may be found desirable to fasten the channel member 50 more securely to the pillar 45 than is required in ordinary practice, and as one method, I have indicated a block 51 welded or otherwise secured to the pillar 45 with a bolt portion extended therefrom through the channel and receiving a nut thereon. A similar construction may be employed at the lower end of the post 45 to secure it to the side frame member of the chassis. As a result of this construction the framing is in effect tubular, as may be appreciated from the diagrammatic perspective sketch in Figure 29. Lateral force due to inertia and sway of the vehicle applied at $a$ will be opposed by compensating forces at $b$ and $c$ as indicated, the rear body frame and shell 58 acting as an anchorage for the channels 50.

It may be found desirable in case of the movable windshield to provide a permanent curved corner or pillar plate 52 of glass, corresponding to the extreme lateral end portion of the windshield 26 before described, permanently fixed between the roof and the body, but extending into the door 13 as before mentioned, while the shield 26 comprises a simple planiform plate of glass adapted to extend slightly in overlapped relation with the corner plate 52, as shown in Figure 23. The shield 26' may be mounted for opening, closing or removal in accordance with previous disclosure or other approved practices.

Figures 16, 17:
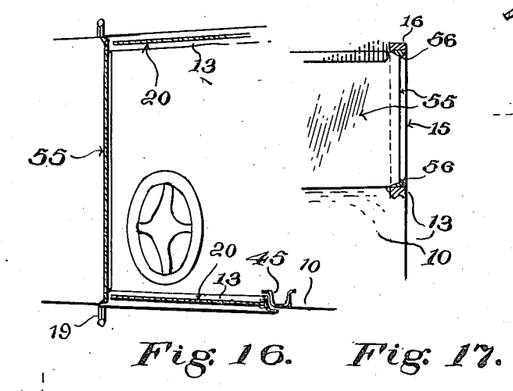
Figure 16 is a fragmentary horizontal sectional view at the extreme forward part of Figure 15.
Figure 17 is a fragmentary view from the front, showing a discretionary construction of the last-mentioned windshield and abutting parts on the door.

In certain types of vehicles the body construction is such that the light 20 or glass in the front door has its forward edge very closely adjacent the frame of the windshield proper, and it is possible to adapt my invention to use with these styles in such manner that a simple, planiform windshield may be utilized, which at its lateral ends would extend closely adjacent the forward edge of the glass in the door and may extend slightly in front thereof. For this purpose, the mounting for the windshield at the rear of the cowl is extended slightly rearwardly between the doors after the manner shown in Figures 26 and 27. The front vertical edge of the door is slightly forward of the plane of the windshield in such case, and the extreme lateral ends of the windshield are shaped to fit between the top member 16 and the lower body portion of the door, immediately in front of the light 20, as shown in Figures 15 to 20 inclusive, and also Figures 25 to 27. If desired, the door may include rubber packing blocks 56, on the top bar 16 and the body of the door at the forward part, these blocks being adapted to abut snugly against the respective upper and lower edges of the windshield 55 which are slightly inclined so as to pass between the elements of the door readily, as shown in Figure 17. The edge of the windshield or the edge of the light 20 may be equipped with a rubber or other weather strip device, such, for instance, as shown in Figure 19, at 57, having a flexible element adapted to form a satisfactory closure between the immediately adjacent edges. It is important to note, however, that the use of such packing, is not essential especially to prevent ingress of air under forward movement of the vehicle, for the reason that in such forward movement, the incident air at the front side of the windshield moving laterally outwardly and rearwardly at the corners, creates an air friction ejector effect and air tends to be drawn outwardly through the joints sufficiently to prevent objectionable winds from blowing in, except when a severe side wind occurs.

Figure 18:
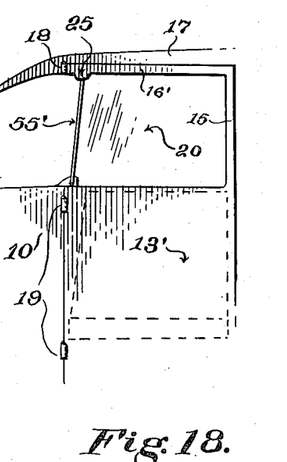
Figure 18 is a fragmentary view similar to Figure 15 of the extreme forward part of the vehicle, showing the windshield inclined within the window opening of the door.
Figure 19:
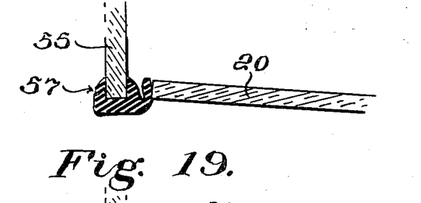
Figure 19 is a fragmentary cross section of the windshield and door, enlarged, to illustrate the use of a removable closure strip or weather strip to close the joint between the windshield and door light.
Figure 20:
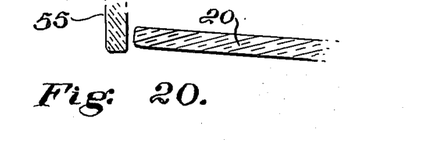
Figure 20 is a similar view showing the relation of the windshield and door light without the strip.
Figure 21:
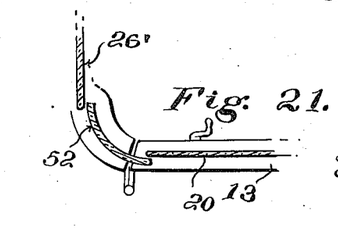
Figure 21 is a fragmentary, horizontal sectional view at the forward corner of the vehicle showing a modification in the construction of the front closure.

It is possible to construct the windshield of Figure 1 in such a manner that it may have a considerable inclination rearwardly from the lower edge toward the top, whereby objectionable reflections on the inner surface are obviated, and such inclination of the windshield may also be accomplished after the manner shown in Figure 18, which consists in providing the upper mounting for the glass on a line a considerable distance rearwardly of the hinge of the door 13, and then trimming the light 20 with a similarly inclined edge at its forward side.

In one type of metal body now in use, the windshield is mounted to swing upon its upper edge, a stop 60 (Figure 27) being formed at the rear edge of the cowl, surmounted by a thin flange 61'. In order to retain the raised stop in the utilization of my invention, the stop 60 is extended into the car between the doors to the extent indicated in Figure 26 or more. On the door 13' a flange 61 may be provided adapted to aline with the stop 60 when the door is closed, and in case the windshield 55 is provided with a rubber stripping 62 on the lower edge, this will form a seal between the body and the door at the forward side against the stop 60 and flange 61 alike. If desired, the stop element may be located at a lower level, even flush with the lower side of the opening 14 in the door, after the manner shown in Figure 26 at 60' the flange 61' then virtually being the only stop element. In such case, the stripping 62 may be carried on the windshield or a flexible rubber strip 63 may be applied to the rear portion of the cowl and resting against the flange 61' after the manner shown in Figure 26, the strip 63 extending laterally outwardly and over the door, so as to close the joint between the door and the adjacent cowl parts, as may be observed. The strip 63 may be used in conjunction with the construction in Figures 25 and 27 also, whereby the lower edge of the windshield may be entirely free of any weatherstrip element when raised.

It will be noted that with the pivot of the hinges located as indicated, which may be the same as in many standard constructions, they are located outwardly of the door a distance, and the glass 20 in the door 13, whether raised or lowered, will move with the door without liability of striking the edges of the windshield whether it is open or closed.

In Figures 30 to 35 inclusive there is illustrated a windshield construction and door structure in which a great inclination of the windshield is attained, and the windshield parts are movable so as to entirely open and clear the front portion of the vehicle, and providing means whereby the glass elements having no metal reinforcement at the edges may be safely and positively supported in nearly or quite horizontal position.

Figures 29, 32, 33:
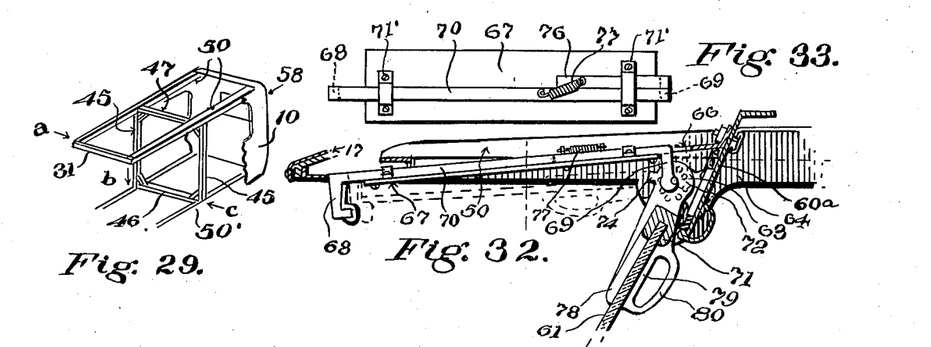
Figure 29 is a diagrammatic perspective of the elements in the body framing disclosed herein.
Figure 32 is a longitudinal section of the structure at the upper part of Figures 30 and 31.
Figure 33 is a top view of the shield support assembly for engaging the swinging edge of the shield.
Figure 30:
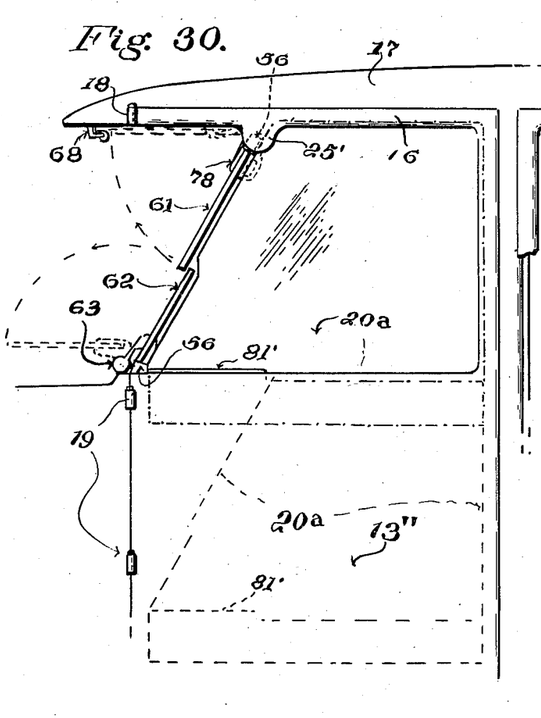
Figure 30 is a fragmentary side elevation of a vehicle body with a deep cant, and a shield element movable to concealed position.
Figure 31:
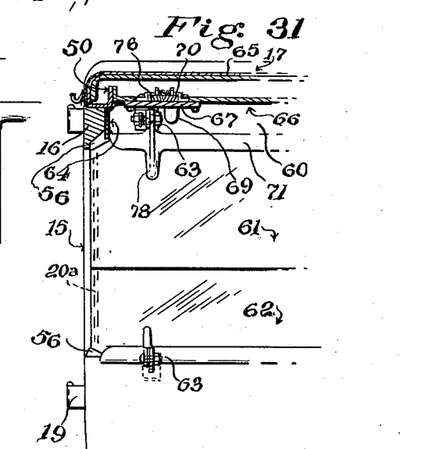
Figure 31 is a front view of the left hand portion of the structure of Fig. 30 with a portion of the roof in section.

In this instance, a transverse metal plate 60ª is mounted between the side members 50 of the roof and on this plate the upper windshield section 61 is pivoted. The shield includes a lower section 62 pivoted on the cowl, both sections being mounted by means of one of the familiar forms of friction devices 63 by which the shield may be yieldingly checked in various positions, the details of which are well understood in the art and therefore not illustrated or described particularly. The plate 60ª extends downwardly below the top of the window opening in the side door, and at each side a plate 64 of ornamental form is carried by the roof side members, having a downward extension covering the end of the plate 60ª and some space thereadjacent. The door 13″ is constructed and mounted substantially the same as before described, with an extension 25′ from the top bar (corresponding to the one 25) located a considerable distance rearwardly from the forward end of the bar, alined with the corresponding part of the plate 64. The light 20ª is cut with a diagonal front edge extending from within the extension 25′ to the extreme forward edge of the door at the lower side of the window opening. The forward end of the bar 16 and the body of the door are hinged on a common axis as before described.

It should be understood that the use of the hinge 18 at the forward ends of the top bars of all the doors as described serves not merely as a hinge for supporting the door as a whole, but as a structural stiffening and reinforcement for the top bar of the door, insuring its certain and safe alinement with the lower or body part of the door, and to safely support the light 20 when raised.

The line at which the upper and lower sections of the shield meet is preferably below the plane of the optical horizon of the driver of the car, and near the cowl. This will make the lower section of short radius and obviate need for any intermediate support at a distance from its pivot axis. The upper section when adjusted at intermediate positions in its range of movement will be saved from liability of fracture by vibration or road shocks because of the tendency of the hinge means to yield to excess downward pressure, so that the shield will move to a lower position instead of being strained excessively under abnormal shocks transmitted through the body of the vehicle.

To secure the upper shield section positively and safely in fully raised position, I have provided automatic means to co-engage with the extreme outer part when raised, manually releasable for lowering of the shield. The roof is extended forwardly of the plate 60 to the normal length with respect to the body including the cowl, although it may be extended further or less. The forward edge of the roof may also be additionally provided with a visor, if desired. This extension of the roof beyond the plate 60 is greater than the radius of the upper shield section in the present instance, the side members of the roof being utilized to carry the hinge 18 as before explained. In addition to the top structure material 65, a plate 66 is mounted therebelow a distance extending from the plate 60 forwardly to the extremity of the roof. This plate is provided with an opening longitudinally of the roof adjacent each side (one being shown), under which opening there is secured to the plate 66 a latch assembly plate 67, a bar 70 being slidable in straps 71 on the upper side of the plate 67, the bar having downwardly extending arms 68 and 69 at the forward and rear ends. At the forward limit of sliding movement of the bar 70 the arm 68 is beyond the radius of the upper shield section, and is provided with a padded part to engage under the edge of the raised shield when the bar 70 is drawn rearwardly. The arm 69 extends downwardly close to the pivot axis of the shield where it may be pressed upon by the thumb of an operator of the open shield from within the vehicle. It may be extended to any other point convenient for such manipulation. The upper edge of the shield is reinforced by a metal channel member 71, from which extend upwardly ears 72 each forming one element of a friction pivot device as before mentioned. Preferably there is one of these pivot devices adjacent each side of the shield. Each arm 69 extends downwardly a distance inwardly of the respective ear 72.

On the forward side of the ear 72 when the shield is closed there is formed a strike lug 74, and beside the bar 70 a short bar 76 is mounted separately slidable on the plate 67 and having a strike arm extending downwardly in the path of the lug 74, so that upon raising of the upper shield section, the bar 76 will be moved rearwardly. The bar 76 is connected to the bar 70 by a contractile spring 77, so that the bar 70 will also be drawn rearwardly by raising of the shield, but will be releasable against the action of the spring by manual pressure on the arm 69. The mounting of the glass in the upper shield section may include downward extensions 78 and 79 at the front and rear sides of the glass, which extensions may be secured to the glass in any approved fashion, and the rear extension may include a grip 80 by which the shield may be drawn downwardly to closed position, the arms 69 being pressed by the thumbs of the hands that grasp the grips, in the initial part of such closing movement. As the mounting described provides for movement of the shield away from the plate 60 a weather stripping may be provided on the lower edge of the plate to form a snug closure, and it will be seen that with the shield in intermediate positions, a certain amount of air will blow over top of the shield into the vehicle. The upper section of the shield may overlap the lower section as in Figure 30, or both may lie in the same plane, as in Figure 35, weather stripping adapted to be frictionally held on the edge of the glass being available for both arrangements, to positively close the spaces between mutually adjacent edges of glass' elements.

Figures 34, 36:
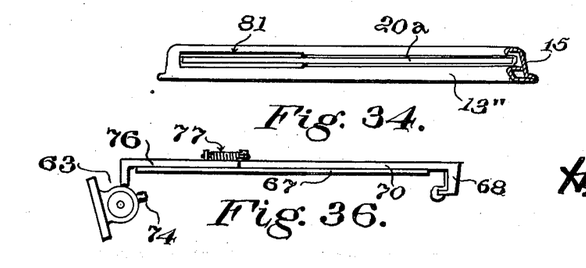
Figure 34 is a top view of the door with the top bar removed.
Figure 36 is a detail elevation of the parts in Figure 33, from the side opposite that shown in Figure 32.
Figure 35:
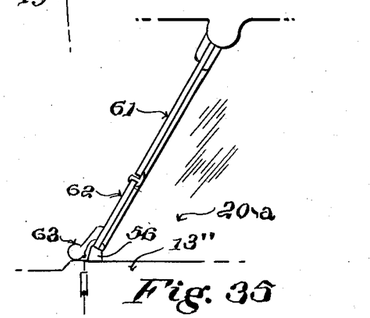
Figure 35 is a view of the utilization of the structure of Figures 30-33 to aline the upper and lower shield sections when closed.

The slot in the door body 13' accommodating the light 20ª may be broadened from its forward end to the point at which the diagonal edge of the light stops in the slot when the light is lowered, and an element 81 attached to the light or its mounting to close this part of the slot by fitting therein, and thereby also steadying the light when raised.

Observation has shown that most of the serious injuries from windshield glass in automobile accidents result from cuts inflicted by large or small fragments retained in the lower parts of the encircling metal mounting or frame in which the glass is fixed. In my invention there is a minimum encircling metal framing or reinforcement, so that when the windshield is fractured, the broken lower parts are free to drop away instead of being retained and presented in such positions as to be apt to inflict injury.

I claim:

1. In a motor vehicle, a body including a passenger accommodating portion having a driver's seat and a top thereover, rearward and intermediate supports between the body and top, the top projecting forwardly to form a canopy unconnected with the body from adjacent the said seat to its extreme front edge, a transparent windshield carried by one of the principal elements named, viz, the body and top; a door hinged between the top and body at their forward parts and having a window opening therein opening through the front edge of the door for a substantial distance vertically adjacent the normal field of vision and a transparent closure for said opening; said windshield having an uncovered lateral edge of its transparent portion disposed to lie symmetrically adjacent the front edge of the said transparent closure of said door to form together a continuous transparent closure across the front and on the side of the vehicle adjacent said seat.

2. The structure of claim 1, in which said transparent portion of the windshield is formed with rearwardly extended lateral edge portions disposed closely without and parallel to the forward edge of the first named closure.

3. In a vehicle construction, a body and a roof, the body having a doorway therein adjacent the forward part of the roof, a windshield between the body and roof extending from adjacent the forward side of said doorway rearwardly and upwardly toward the roof, in a plane extending rearwardly over said doorway but stopping short on a line intermediately of the fore and aft extent of the doorway, a door hinged at the forward side of said doorway and constructed to conform to the inclination of the windshield, and a top element on the door extending forwardly of the windshield in line with the roof, and hinged at its forward extremity to the roof on a common axis with the first mentioned hinge of the door.

4. The structure of claim 1 in which said lateral edge of the transparent windshield portion extends rearwardly and is disposed symmetrically adjacent, outwardly of, and in a plane parallel to the forward edge of the said transparent closure of the door in overlapping relation.

5. In constructions of the character described, a hinged closure, a movable support adjacent the swinging edge of the closure, initially clear of the path of the closure, and means to form an operative connection at times between the support and a part of the closure adjacent its hinge axis.

6. The structure of claim 5 in which said means to form an operative connection includes an elastic element, and manually operable means to move the support from supporting position to inoperative position.

7. In a structure of the character described including a body element having a doorway, a door closure therefor, having an upper window opening through the forward edge of the door closure, and a transparent closure in the door opening; a transparent windshield arranged transversely of the vehicle coacting with the first transparent closure to form a continuous transparent closure transversely of and laterally on the vehicle; a cowl element included in said body extending transversely of the vehicle and having a portion projected rearwardly so as to intervene between the said door at one side and a like point at the other, and coacting with the transverse transparent closure to form a weather-tight joint between the body, the door and transverse closure rearwardly of the forward edge of the door opening in the body.

8. In a vehicle of the character described, a body portion and roof, the roof projected to form a visor, a windshield mounted on the roof at the forward upper limit of the body for swinging movement from operative position forwardly and upwardly to an inoperative position in close coordination with the visor and a support for the swinging edge of the shield on the visor having a distant manual release operable from within the body.

9. In a vehicle of the character described, a body, a roof therefor, the body including a post supporting the roof and having a door-opening forwardly thereof, said door having a lower part hinged to the body and having a window opening therein at the upper part and including a top rail having a hinged connection with the roof on the axis of the first mentioned hinge, a windshield mounted between the body and roof having an operative position extending from adjacent the hinge axis of the door at its lower part to a line intersecting the said rail a substantial distance rearwardly of said axis, said door having a window and closure portion the forward side of which is closely adjacent and corresponding to the line of intersection of a lateral projection of the windshield with the door, said top rail projecting forwardly thereof and being unconnected with the lower part of the door at the forward end.

10. A motor vehicle construction characterized by the location of a windshield in a position sloping rearwardly from its lower part to a line well within the fore and aft dimension of the door beside the driver's seat and in which the door is formed with a window part having its forward boundary similarly arranged, but the top rail extended forwardly thereof and hinged to the vehicle roof on an axis with the conventional hinges at the lower forward part of the door.

In testimony whereof I affix my signature.

HORACE L. WOODWARD.